Dec. 28, 1954     V. F. BAUMGARDNER     2,698,167
PAVEMENT REPAIRING MACHINE
Filed Aug. 30, 1951     3 Sheets-Sheet 1

INVENTOR.
V. F. Baumgardner
BY Robb & Robb
Attorneys.

Dec. 28, 1954     V. F. BAUMGARDNER     2,698,167
PAVEMENT REPAIRING MACHINE

Filed Aug. 30, 1951     3 Sheets-Sheet 3

INVENTOR.
V. F. Baumgardner
BY Robb & Robb
Attorneys.

2,698,167

PAVEMENT REPAIRING MACHINE

Versal F. Baumgardner, Celina, Ohio, assignor of one-half to Jean Evelyn Brown, Columbus, Ohio Application August 30, 1951, Serial No. 244,399

1 Claim. (Cl. 259—156)

This invention relates to pavement repairing machines, a type of machine which has not heretofore been proposed.

More particularly this machine has been designed so as to handle what are known as hot-mix materials, and the various components thereof, the same being adapted to supply materials as required for small pavement repairing jobs, or in some cases for small pavement jobs where accessibility on the part of much larger machines of a different type, is out of the question.

Pavement repairs in general, for pavements which have been damaged by frosts or other causes, wherein small patches here and there over the face of the pavement have deteriorated or been eroded or in any other manner left pockets in the surface of the pavement which require to be filled in order to preserve the pavement and again present a smooth surface for travel thereover, have been performed in the past by either a cold mix of asphaltic material, brought up to the particular spot in a suitable dump truck, and shoveled out by hand into the location, to thereafter be spread and tamped into place, or under other circumstances where a hot mix has been required a similar manner of handling the materials has been resorted to.

All of the foregoing rely upon mixture of the materials at a central mixing plant and thereafter transport of the same to the particular location where the same are to be used and thereafter the emplacement of the same in the spot to be repaired in small quantities. This has resulted in many cases in a large quantity of waste, by reason of the fact that the material in the truck becomes cold, since in general a large truck-load has had to be purchased by the contractor who is effecting the repairs, and the material has therefore had to be dumped and left in a location, since the quantity to be used in any particular spot is relatively small. Where materials are furnished from a central mixing plant, and dumped in heaps along a road to be repaired, there is the necessity for much handling to be resorted to, in moving the materials from the spot where they are dumped to their place of use on the pavement.

In addition, under many circumstances where hot-mix asphalting material would ordinarily be availed of, the same is not used because of the small quantity required in any one location, and the obvious uneconomic requirement that purchase of the same be made in large quantities, and thus waste results. Where this circumstance is prevalent, use of cold-mix is resorted to, but cold-mix is not as satisfactory under most circumstances as a good hot-mix would be.

With the foregoing in mind, it is therefore a principal object of this invention, to provide a machine wherein hot asphaltic mixed materials may be furnished as desired, in the quantities required, in accordance with the patching work to be done, and a substantial reduction in waste of materials is afforded. In fact, there is no requirement that any waste be resultant from the use of this machine for pavement repairs.

It is a further object of this invention to provide a small machine having the characteristics which are desirable for carrying out the object just above described, which machine is transportable from place to place at high speed, in order to furnish the materials as required in small or relatively large quantities.

It is a further object of this invention to provide a novel form of machine, wherein the materials to be mixed are furnished to the machine from a truck or the like, into a hopper and thereafter by certain metering means, to effect a mixing of the gravel or crushed stone provided with an asphaltic material, the asphaltic material being supplied from a tank carried by the machine itself.

It is a still further object of this invention to provide a machine wherein the materials furnished as above set forth, may be mixed continuously and deposited in a suitable hopper at the rear thereof, in a continuous manner, or if desired in an intermittent manner in accordance with the requirements of the pavement to be repaired.

It is a further object of this invention to so design the machine hereof that the same will transport the liquid bituminous mix which is to be mixed with crushed stone or gravel, at the same time maintaining the said bituminous material under heated conditions as required, and mix the said bituminous material with the crushed stone or gravel in small or large quantities in a continuous or interrupted manner.

It is a still further object of this invention to so arrange the mixing means, which is carried by the machine itself, so that same is surrounded by the heated asphaltic or bituminous material and to thereby maintain the materials being mixed in a heated state, to thereby deliver the same for use heated in accordance with requirements, whereby the same may thus be placed in the depressions or holes which are to be repaired.

It is a still further object of this invention to provide a mixing arrangement which is entirely substantially enclosed during the mixing process, the materials entering at one end thereof in the relatively raw and unheated state, and passing through this closed mixing chamber while being mixed, and maintained under heated condition, and to thereafter be deposited in a suitable bin from whence the materials may be transported by hand to the place which is being repaired.

It is a still further object of this invention to provide a bin at the rear of the machine, having a suitable platform thereon adapted to support the mixed materials delivered thereto by the mixing arrangement, whereby the said platform is at a suitable height for ease of removal therefrom by manual labor, whereby delivery to the particular spot being repaired is facilitated.

It is a still further object to arrange the platform upon which the material mixed in the machine may be deposited, whereby the same is at appropriate height from the pavement whereby the laborer who is to remove the same by shovel may do so without a material change in position, and thereby speed up the delivery of the materials to the particular spot where they are to be used.

It is a further contemplation of this invention to provide a platform which is accessible to a plurality of laborers who are to place the materials in a particular damaged spot whereby a minimum amount of interference is resultant and to thereby measurably increase the efficiency of repair operation.

It is a still further object of this invention to provide a compact relatively small machine, which is self-contained and is virtually a small portable mixing plant, having all the necessary facilities thereon for properly mixing materials of the bituminous type and to provide novel metering means for the dry and wet materials to the mixing arrangement at the same time keeping the wet or bituminous material constantly flowing during operation of the machine and at the same time to heat the same as required with a novel arrangement for such heating.

It is a still further object of this invention to provide a machine of the type herein discussed wherein all of the usual patching material may be supplied to the spot where the same is used, suitable means being provided for spraying the liquid portion of the mix as a liquid alone to the edges of the pavement breaks, and to thereafter make available sufficient mixed aggregate to fill the spot to be repaired in accordance with usual and conventional practice.

It is a still further object of this invention to provide a novel heating arrangement for the liquid portion of the aggregate together with the aggregate after it has been mixed and while it is passing through the closed mixing chamber and to further avail of simple means for supplying the fuel to be used in the heating arrangement, to thereby further enhance the compactness and unitary arrangement of the machine.

Other and further objects of this invention will be apparent from a consideration of the specification appended hereto, taken in conjunction with the drawings wherein:

Figure 5 is a fragmentary sectional view illustrating the arrangement of the mixing means in the machine.

Figure 6 is a similar fragmentary view in section, illustrating the manner of mounting of the mixing devices in the mixing means.

Fig. 7 is a fragmentary sectional view taken about on the line 7—7 of Figure 1 looking in the direction of the arrows, showing the relationship of the mixing means and the means for metering dry aggregate thereto.

Figure 8 is a fragmentary view illustrating the arrangement for coordinating the delivery of liquid aggregate and dry aggregate to the mixing chamber, taken about on the line 8—8 of Figure 1.

Figure 1:
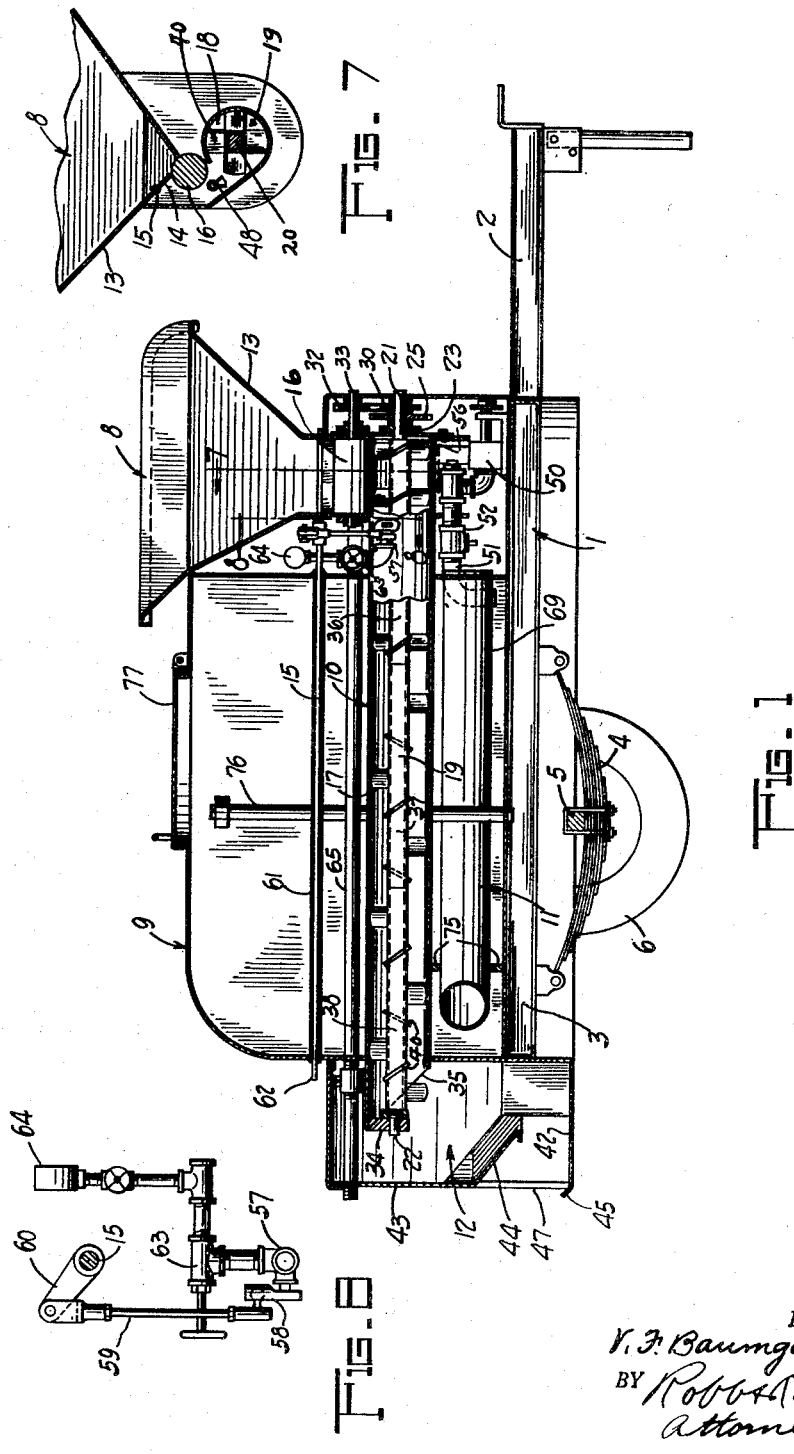
Figure 1 is a longitudinal sectional view of the machine taken about through the center thereof, and illustrating in general the various provisions and accessories provided for carrying out the objects hereof.

Referring now to Figure 1, the machine of this invention, is generally illustrated, as comprising a trailer unit preferably, in which a frame generally designated 1, having a tongue portion 2, and a body supporting portion 3, is supported for transport by means of the undercarriage generally designated 4, the undercarriage being one of largely conventional construction, including an axle 5, together with suitable springs engaged therewith, usual wheels 6, being provided at the ends of the axle.

Suitably fastened to the frame 1, and supported thereon, are the power and transmission units generally designated 7 (see Figure 4), the material hopper and metering means designated 8, generally, the liquid storage tank designated 9, the mixing means designated 10, the heating arrangement designated 11, and the storage bin designated 12.

The hopper and metering arrangement 8, more particularly illustrated in some details in Figure 7, comprises a hopper 13, substantially wider at the top portion thereof than at its lower portion, said hopper 13 having at its outlet or bottom end, a suitable swinging gate 14, adapted to be operated in a manner to be hereinafter set forth, the same pivoting about the shaft designated 15. A suitable cylindrical roll 16 extends from end to end of the hopper outlet, and is contacted by the gate 14, the said roll being adapted to be rotated in a counter-clockwise direction by power means to be further described. Suitably mounted beneath the roll, which roll is supported in bearings provided therefor, for rotation, is the mixing means 10 previously referred to, said mixing means comprising a tube 17, of substantially larger diameter than the roll 16 heretofore referred to, extending from end to end of the machine, virtually. The said mixing tube is provided with an opening designated 18, just beneath the roll 16 previously referred to, and includes therein the pugmill unit designated 19, generally, the said pugmill unit 19 comprising a square shaft (see Figure 5), designated 20, having a cylindrical bearing portion 21 at one end and a similar bearing portion 22 at the other end. The bearing portion 21 is supported in a suitable sleeve bearing 23, below the hopper unit 8, previously referred to, the said bearing 23 being mounted on a plate member 24 (see Figure 4), which is virtually an extension of the hopper 13, and below the said hopper.

Adjacent the bearing 23 previously referred to, is a suitable sprocket 25, fixed to the end of the shaft 21, and adapted to be rotated by means of a motor 26, having a suitable transmission unit 27 fixed thereto, the said shaft of the transmission unit in turn having a sprocket 28 thereon, adapted to be connected with the sprocket 25 previously referred to, by means of a chain 29. It will be apparent that rotation of the sprocket 28 will impart rotative movement to the shaft 20 of the pugmill mixing arrangement by reason of the arrangement above set forth, and in addition suitably mounted outwardly of the sprocket 25 is a further sprocket 30. The sprocket 30 is suitably fixed to the shaft end 21, and in turn connected by means of a chain 31, to a sprocket 32, suitably fixed to the end of a shaft 33, which shaft is in turn connected with the roll 16, previously mentioned. It will be clear that the rotative movement imparted to the sprocket 25 and shaft 20 upon which the same is mounted, will in turn cause rotation of the cylinder roll 16, although at a somewhat different speed, as controlled by the size of the respective sprockets connected to the respective shafts driven by the chains connecting the same.

Mounted on the frame to the rear of the hopper and metering unit is the storage tank 9, the same comprising a substantially rectilinear unit formed of heavy plate and adapted to retain therewithin the bituminous liquid. Suitably fastened to the respective end-walls of the tank 9 is the tube 17 of the mixing unit 10. This may be effected by welding the said tube in suitable openings provided in the end walls of the tank, said tube extending forwardly of the tank, beneath the hopper and metering unit 8, and exteriorly to the rear of the tank into the discharge bin 12.

Suitably mounted within the tube 17, of the mixing unit 10 is the pugmill shaft and shaft unit 19 previously referred to, and the forward end being supported in the bearing 23 as previously described. At the rear end thereof, a suitable pillow block bearing 34 is fastened to the tube 17, the lower portion of the tube 17 being cut away as at 35. The pugmill unit 19 referred to, comprises as previously mentioned, a square shaft 20, which is adapted to support thereon blade units designated 36, 37 and 38, same being formed of a square tube designated 39, and being in the three sections above designated. The said sections of the tube are provided with suitable paddles or blades 40 thereon (see Figures 5 and 6), and maintained against longitudinal displacement on the shaft 20 by means of a suitable nut 41. It will be apparent that the blade sections 36, 37 and 38 are emplaced on a shaft and then by means of a nut 41, the same may be compressed relatively longitudinally so as to prevent longitudinal movement thereof, and at the same time facilitates replacement of any one of the sections if damaged or otherwise rendered ineffective in service. It will be clear therefore that the shaft or pugmill unit 19 may be removed as a whole from the machine by withdrawing the same through a suitable cover designated 42 (see Figure 4), when required, or for inspection purposes.

More particularly one of the pugmill units 19, namely the unit 36 thereof, includes a blading arrangement at the forward end thereof beneath the hopper 13, whereby a plurality of blades 40 are arranged so as to move the material delivered thereto from the hopper relatively rapidly toward the rear and in to the main mixing portion chamber of the device. This is accomplished by having pairs of blades opposite one another beneath the opening in the hopper 13 and within the tube 17, whereby to cause the rapid rearward movement of materials within the tube, and thereafter the blades are spaced so as to permit a slower rate of movement of the material during its mixing operation.

At the rear of the mixing means 10, the tube 17 is cut away as at 35, as previously mentioned, and thereby the materials passing rearwardly through the tube will be dropped therefrom into the hopper of the storage bin unit 12 and come to rest in a pile or heap on a suitable platform 42, provided therefor. The storage bin 12 is comprised of a transversely extending construction, having a hood 43 enclosing the upper portion thereof and surrounding the end of the mixing tube, and a suitable sloping bin member 44 whereby the materials delivered from the mixing tube are caused to move downwardly toward the inner portion of the bin, and as shown in Figure 3, onto the platform 42, whereby accessibility thereto is afforded and materials piled up in the bin from the member 44 may pass downwardly as required onto the shelf 42, when portions thereof have been removed by shovel. The shelf 42 is constructed so as to be at convenient shovel height, eliminating the necessity for unnecessary stooping and bending to gather materials and a suitable lip 45 is provided whereby materials are not unnecessarily dragged outwardly and rearwardly thereover. The shelf 45 is further formed with mitered corners as at 46 (see Figure 2), whereby accessibility to materials may be afforded to a plurality of men, there being provided substantial accessibility for at least five men at a time, one at each of the mitered corners 46, and three therebetween, the said positions intermediate the mitered corners 46 being separated by suitable supporting rods 47, extending from the platform or shelf 42, upwardly to the bin proper.

Figure 4:
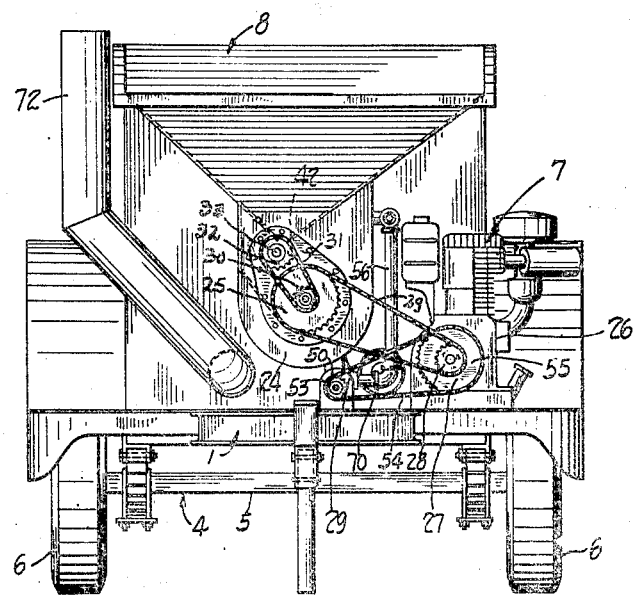
Figure 4 is a view in elevation taken from the front of the machine showing the general arrangement of the power unit, together with the relationship of the heating means, the mixing means, and the measuring arrangement, as they are located in the machine.

Referring now to Figures 1, 7 and 8, it will be noted that there is provided suitable means for spraying the dry aggregate descending from the hopper 13 as the materials pass from the roll 16 into the mixing unit 10. This arrangement for providing the liquid asphalt to the materials as they drop from the roll 16 into the mixing unit 10 includes a spray nozzle designated 48, which is in the path of the stone or dry aggregate, the said nozzle 48 being supplied by a pipe 49 (see Figure 2), the pipe 49 in turn delivering the liquid by means of a pump 50. The pump 50 is piped from the storage tank by means of a supply pipe 51, through a valve 52, whereby the same may be turned on and off, at will. The pump 50, shown in Figure 4 is driven by means of a sprocket 53 on the shaft thereof, said sprocket in turn being connected by means of a chain 54 to the transmission unit 27 previously referred to, said transmission unit having a suitable sprocket 55 thereon, for connection with the chain 54 previously referred to. The pump delivers the liquid to the spray nozzle 48 by means of a suitable pipe 56 connected to the pipe 49 previously referred to, the pipe 49 having a further valve 57 therein (see Figure 8), the said valve 57 being connected by a lever 58 to a toggle link 59, the toggle link 59 in turn being connected to an arm 60, which arm 60 is mounted on the shaft 15 previously mentioned. The shaft 15 also is attached to the gate 14 previously described. The shaft 15 extends through the tank unit 9 and is mounted in a tube 61, which tube 61 is suitably fastened by welding to the front and rear ends of the tank so as to afford a liquid tight connection. The shaft 15 extends outwardly rearwardly of the tank, and is to be rotated by means of a lever 62, whereby movement of the shaft may be effected.

From the foregoing it will be apparent that by grasping the lever 62, and raising the same upwardly as shown in Figure 3, said gate 14 will be rotated and open the same so as to permit the delivery of dry aggregate over the roll 16, and at the same time by means of a toggle connection with said shaft with the valve 57 previously referred to, liquid will be permitted to flow through the nozzle 48 and on to the aggregate dropping over the roll 16. This adjustment of course may be coordinated so as to deliver more or less liquid in accordance with the link 59, the said link 59 being obviously suitably fastened at its respective ends so as to permit the adjustment above referred to.

Additionally the flow of liquid may be controlled by means of a valve 63, which is in the line 56 from the delivery side of the pump 50 previously mentioned. A suitable pressure gauge 64 is provided so as to ascertain the pressure existing within the system, as controlled by movement of the pump. It should also be noted that rotation of the pump to effect the pumping operation as well as rotation of the shaft unit 19 and the roll 16 take place simultaneously in coordinated relationship, and there is no provision made for declutching one of the elements previously mentioned, a factor which will prevent the unnecessary clogging up of the mixing unit, which might take place in aggregates where delivered to the mixing unit without proper delivery of liquid thereto, and thereby a desirable factor is provided, namely one which will prevent unauthorized movement of any of the parts unless all of the same are in operation.

Figure 2:
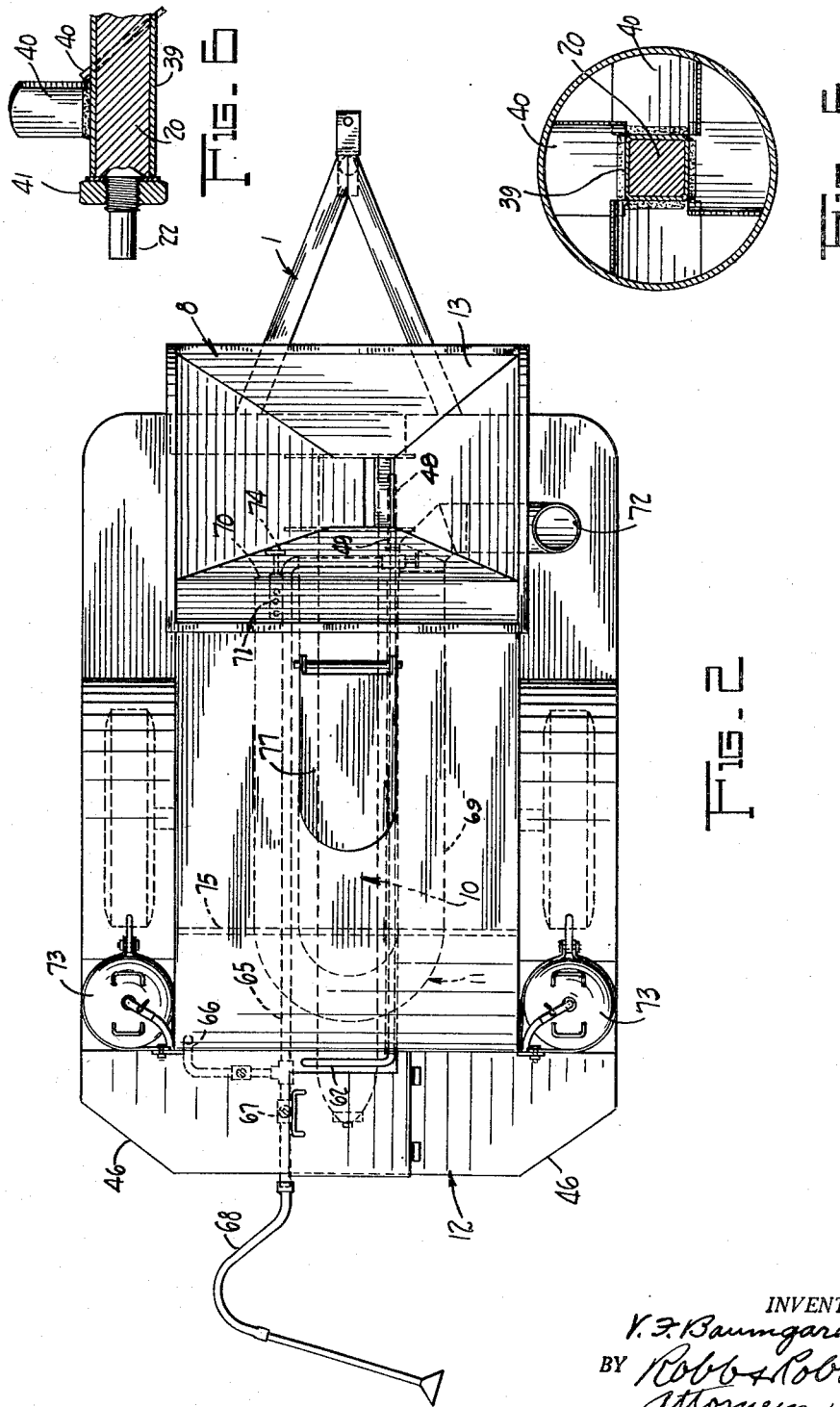
Figure 2 is a top plan view of the machine illustrating the general relationship between the storage tank for the bituminous liquid, the hopper into which the dry aggregates are deposited, and the closed mixing chamber together with the delivery bin and platform provided therefor.
Figure 3:
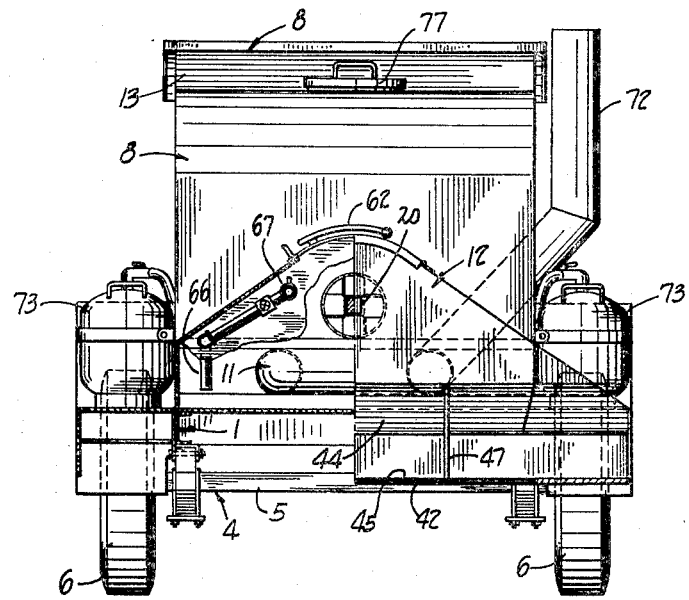
Figure 3 is a view in elevation taken from the rear and partly in section, illustrating relationship of the various parts of the machine.

In order to facilitate circulation of the liquid asphalt within the storage tank unit 9, the arrangement is such that liquid is withdrawn from the lower front portion of the tank through the line 51, and delivered by the pump to the spray nozzle 48, any excess liquid being bypassed through a tube or pipe 55 to the rear of the tank, as indicated at 66 in Figure 2. It will thus be apparent that circulation of the liquid in the tank 9 is effected by reason of the withdrawal from one end and bypassing of the excess to the other end. The line 65 leading to the rear of the tank is also provided with a suitable valve 67 within the bin unit 12, whereby suitable spray arrangement designated 68 may be hooked up so as to spray a sealer on the already patched road. This spray unit is of generally conventional construction and is not further referred to herein.

Referring now to the heating arrangement, the said heating means generally designated 11, comprising a substantially U-shaped tube 69, is supported within the tank unit 9, as shown generally in Figures 1 and 2, said tube being welded or otherwise secured at its ends to the front wall of the said tank, and being confined within the tank. As shown in Figure 2, the said tube is open at one of the branches thereof as at 70 (see also Figure 4) and there is suitably supported in this open end of the branch a suitable burner designated 71, of any generally conventional and known construction. The tube extends in a U-shaped manner as previously indicated around through the tank and is provided at its opposite branch to that first referred to with an exhaust stack 72. The fuel for the burner 71 is provided by means of suitable compressed gas tanks 73 supported on opposite sides of the tank unit 9 and rearwardly thereof, the same being piped in suitable manner to the burner unit 71, the said burner unit 71 in turn being provided with a valve 74 thereon for controlling the supply of gas to the heating tube.

It will be apparent that the arrangement of the heating unit 11, below the mixing unit 10, and within the tank unit 9, affords a novel manner of heating the aggregates while they are being mixed within the mixing unit 10, and at the same time raises the temperature of the liquid which is also surrounding the mixing unit 10, to thereby maintain the materials being mixed at a suitable temperature during the mixing operation, all of the foregoing affording a novel arrangement not heretofore contemplated. It should be further noted that the tube 69 is provided near its rear portion with suitable spacer members, designated 75, welded across the tube, and fastened thereto, although not secured to the bottom of the tank nor secured to the mixing tube 17. This provision enables expansion and contraction of the tube in accordance with material from which the same is comprised and prevents the tube from unauthorized movement upwardly and downwardly at its ends. The tube 17 extends through the tank 9.

A suitable overflow pipe designated 76 is provided extending within the tank unit and nearly to the top portion thereof, whereby when the same is being filled through a hatch 77, excess liquid will flow through the tube and downwardly through the bottom of the tank and not spill over the machine itself.

The operation of the machine may be summarized by stating that as indicated, the same comprises a trailer, adapted to be drawn along behind a suitable dump truck, in which are carried the dry aggregates such as stone or gravel, which are in turn delivered into the hopper unit 8, by shoveling or the like. Thereafter when materials are required to be mixed the engine unit 7 is started into operation, which causes rotation of the roll 16 and the pugmill unit 19, as well as operation of the pump for pumping the asphalt mix. Thereafter the operator may grasp the handle 62, and raise the same in a clockwise direction, causing the gate 14 to be opened and permitting the gravel to pass over the roll 16, the operation of the handle 62 at the same time effecting an opening of the valve 57, permitting the liquid to flow through the nozzle 48, and thus be distributed over the gravel falling from the roll 16 into the mixing unit 10. The mixing unit 10 being in operation whereby the blades carried therein are rotating will cause the gravel and asphalt liquid to be mixed by means of the blades 40 on the shaft 20, said blades in turn effecting rearward movement of the material through the tube 17 and then outwardly at the rear thereof and downwardly to the storage bin unit 12 and the platform or shelf 42.

During the course of the previously mentioned operation, it will be apparent that the burner unit 71 has been ignited so as to cause the asphalt liquid within the tank unit 9 to have been previously heated, and thereby the asphalt liquid within the tank together with the heating of the unit 11, will maintain the mixed materials in a heated condition while they are passing through the mixing unit 10. This arrangement further enables the use of gravel or stone which is otherwise not as dry as would normally be the case, and a drying effect is also imparted thereto while the same is being mixed with the asphalt liquid.

As material is removed from the platform or shelf 42 by the shovels of the workmen and distributed to the places where required, further material is being supplied to the shelf by means of the inclined bottom 44 of the storage bin unit 12, and being constantly replenished, if necessary. When materials are no longer required, the machine may be shut off so as to stop further mixing operation of the mixing unit 10, and by reason of its relatively small size no very substantial quantity of material may be mixed beyond the requirements of the actual location of the repair work. By the same token the machine may be started up and placed into operation, in a very short time, so as to provide small quantities of material where needed, or if necessary to provide a continuous supply of materials in a relatively large place being repaired.

In view of the foregoing description of the various parts of the machine and operations thereof, it will be apparent that there is hereby provided a novel form of machine, which is capable of providing small quantities of hot-mix material where required, the same being very flexible in its operation so as to provide a continuous amount of material or just small batches thereof. It should also be understood that where required, materials may be passed through the mixing unit without the addition of asphalt liquid thereto, by mere operation of a suitable valve whereby the asphalt liquid may be turned off and thus dry aggregate may be provided so as to be distributed where necessary under certain circumstances.

Having thus shown and described my invention what I claim as new and desire to secure by Letters Patent of the United States is:

In a machine of the class described, in combination, a liquid storage tank, a mixing unit comprising a tube extending through said tank and mixing members rotatably supported within said tube, said tube being adapted to be surrounded by liquid in said tank, a heating tube in said tank below said mixing tube and extending substantially parallel thereto, said last named tube also being adapted to be surrounded by liquid in said tank, dry and liquid aggregate supply means for said mixing unit, power means for operating said mixing member and said aggregate supply means, said heating tube comprising a U-shaped member, and the aggregate supply means including a pump for pumping liquid in the tank, a hopper, a discharge means for said hopper and a roll for moving aggregate therefrom, the said pump being adapted to force liquid onto aggregate moving off the roll aforesaid, and control means for simultaneously regulating the quantity of liquid and dry aggregate.

References Cited in the file of this patent

UNITED STATES PATENTS

| Number | Name | Date |
|---|---|---|
| 747,652 | Schillinger | Dec. 22, 1903 |
| 986,257 | Willman | Mar. 7, 1911 |
| 1,646,582 | Halliburton | Oct. 25, 1927 |
| 1,829,066 | Shelton | Oct. 27, 1931 |
| 1,966,647 | Ross | July 17, 1934 |
| 1,969,533 | Pipes et al. | Aug. 7, 1934 |
| 2,164,257 | Riza | June 27, 1939 |
| 2,305,938 | Turnbull | Dec. 22, 1942 |

FOREIGN PATENTS

| Number | Country | Date |
|---|---|---|
| 27,479 | Great Britain | Oct. 20, 1904 |
| 356,661 | France | Dec. 6, 1905 |
| 527,079 | France | Oct. 20, 1921 |